United States Patent
Harned et al.

(10) Patent No.: US 9,451,789 B2
(45) Date of Patent: Sep. 27, 2016

(54) BREADING SIFTING TABLE

(71) Applicant: AyrKing Corporation, Louisville, KY (US)

(72) Inventors: Chad Harned, Louisville, KY (US); James Bell, Louisville, KY (US); Donald King, Louisville, KY (US)

(73) Assignee: AyrKing, Louisville, KY (US)

(*) Notice: Subject to any disclaimer, the term of this patent is extended or adjusted under 35 U.S.C. 154(b) by 632 days.

(21) Appl. No.: 13/915,658

(22) Filed: Jun. 12, 2013

(65) Prior Publication Data

US 2014/0366750 A1 Dec. 18, 2014

(51) Int. Cl.

| A23B 4/02 | (2006.01) |
|---|---|
| B02C 25/00 | (2006.01) |
| B23Q 15/00 | (2006.01) |
| A01J 27/02 | (2006.01) |
| A21C 9/04 | (2006.01) |
| A23G 3/20 | (2006.01) |
| A23G 3/26 | (2006.01) |
| A23P 1/08 | (2006.01) |
| A23N 4/08 | (2006.01) |
| A21C 15/00 | (2006.01) |
| A23N 4/04 | (2006.01) |

(52) U.S. Cl.
CPC ............... *A23P 1/082* (2013.01); *A23P 20/12* (2016.08); *A21C 15/002* (2013.01); *A23G 3/26* (2013.01); *A23N 4/04* (2013.01); *A23N 4/085* (2013.01)

(58) Field of Classification Search
CPC ........ A23N 4/04; A23N 4/085; A23N 15/08; A21C 15/002; A21C 9/04; A23P 1/082; A23G 3/26; A23G 3/24; A01C 1/06; B01J 2/006; A23B 7/10; A23B 4/021; A23B 4/052; A47J 37/1219

USPC ...... 99/486, 494, 450.1, 516, 534, 535, 352, 99/407; 118/13, 16, 189, 19, 23, 303, 29
See application file for complete search history.

(56) References Cited

U.S. PATENT DOCUMENTS

| 1,739,642 | A | * | 12/1929 | Light | A23G 3/2076 118/19 |
|---|---|---|---|---|---|
| 3,520,277 | A | * | 7/1970 | Gordon | A47J 37/1271 118/23 |
| 3,855,965 | A | * | 12/1974 | Gordon | A47J 37/00 118/16 |
| 3,910,227 | A | * | 10/1975 | Reece | A21C 1/00 118/29 |
| 5,020,427 | A | * | 6/1991 | Kennefick | A23P 1/082 118/16 |
| 5,051,169 | A | * | 9/1991 | King | B07B 1/20 209/274 |
| 5,664,489 | A | * | 9/1997 | Herrick, IV | A23P 1/083 118/19 |

(Continued)

*Primary Examiner* — Dana Ross
*Assistant Examiner* — Hemant Mathew
(74) *Attorney, Agent, or Firm* — Maginot, Moore & Beck, LLP

(57) ABSTRACT

A food coating apparatus includes a drum assembly with an input end for receiving coating material and food product, a hollow body for mixing the coating material and the food product to form coated food product and used coating material, and an output end for allowing coated food product and used coating material to exit the drum assembly. A basket is arranged adjacent to the output end of the drum assembly to retain the coated food product and pass the used coating material that exit the drum assembly. A funnel pan collects and funnels the used coating material passed by the basket into a sifter which separates the used coating material into refuse and reusable coating material. A reclamation receptacle receives the reusable coating material from the sifter and is removable from the food coating apparatus to enable pouring the reusable coating material from the receptacle into the drum assembly.

11 Claims, 7 Drawing Sheets

(56) References Cited

U.S. PATENT DOCUMENTS

| | | | | |
|---|---|---|---|---|
| 5,937,744 A * | 8/1999 | Nothum, Sr. | ........ | A23G 3/2076 118/13 |
| 6,953,004 B2 * | 10/2005 | Dove | ................... | B65G 15/105 118/13 |
| 8,001,920 B2 * | 8/2011 | King | ...................... | A23L 1/005 118/13 |
| 2005/0016447 A1 * | 1/2005 | Dove | ................... | A21C 15/002 118/13 |
| 2006/0156931 A1 * | 7/2006 | Mather | ................... | A23L 1/005 99/494 |
| 2007/0264397 A1 * | 11/2007 | Mather | ................... | A23L 1/005 426/295 |
| 2008/0283366 A1 * | 11/2008 | Karpinsky | ............... | A21C 9/04 198/763 |

* cited by examiner

BREADING SIFTING TABLE

BACKGROUND

This invention relates generally to the field of food processing and more particularly to the field of an apparatus to apply coatings or breadings to food products.

Many food products are covered with a coating or breading to enhance the flavor and facilitate cooking of the product. Where preparation time is not of great concern, the food product, such as a chicken breast, can be manually coated by rolling the chicken breast in the coating material and patting or massaging the coating material directly on the chicken. Manual breading or coating is well-known to provide the most complete and uniform coverage for a particular food item.

However, in commercial settings where preparation time is of the essence, manual breading has given way to machines that automatically coat a food product. Food product coating machines come in different varieties that are often dependent upon the type of food being breaded. Many commercial and fast-food restaurants use a drum type breader to coat food, such as parts of chicken, with a breading or fine flour mixture. Some traditional breaders include a tilted rotatable drum with an apertured interior wall that is configured to tumble the food product as it is gravity fed to the output end of the drum. In some breaders, elements are affixed to the interior wall of the rotating drum to help tumble the food product as it progresses along the length of the drum. One exemplary breader is that described in U.S. Pat. No. 8,001,920 for an Automatic Food Product Breading Apparatus, the description of which is incorporated herein by reference.

In traditional breaders, coated food product exits the drum via an opening in the output end of the drum. Whether the food product is gravity fed or pushed out of the drum, some amount of used coating material exits the drum along with the coated food product. Generally, this used coating material is collected in some receptacle and is either discarded or is reused. If the used coating material is discarded, inefficiency exists in the breading process as some of the product resources are wasted. If the used coating material is reused, inefficiency exists in the breading process as some of the time and labor resources are spent collecting and sifting the used coating material to be reused.

There is a need for an automatic coating or breading apparatus that can reclaim used coating material from the drum and prepare it to be reused. Optimally, the apparatus would automatically collect and sift the used coating material, while doing so in a high production, quick turn-around setting. There is a further need for a breading apparatus that minimizes the product resources wasted and/or the time and labor resources spent to coat food product.

SUMMARY

A food coating apparatus includes a drum assembly, a basket, a funnel pan, a sifter, a reclamation receptacle, and a refuse receptacle supported by a table assembly. The drum assembly has an input end for receiving coating material and food product, a hollow body for mixing the coating material and the food product to form coated food product and used coating material, and an output end for allowing coated food product and used coating material to exit the drum assembly. The basket is arranged adjacent to the output end of the drum assembly to retain the coated food product and pass the used coating material that exit the drum assembly. The funnel pan collects and funnels the used coating material passed by the basket into the sifter which separates the used coating material into refuse and reusable coating material. The refuse receptacle receives the refuse coating material and the reclamation receptacle receives the reusable coating material from the sifter. The reclamation receptacle is removable from the food coating apparatus to enable pouring the reusable coating material from the receptacle into the drum assembly.

DETAILED DESCRIPTION

Figure 1:
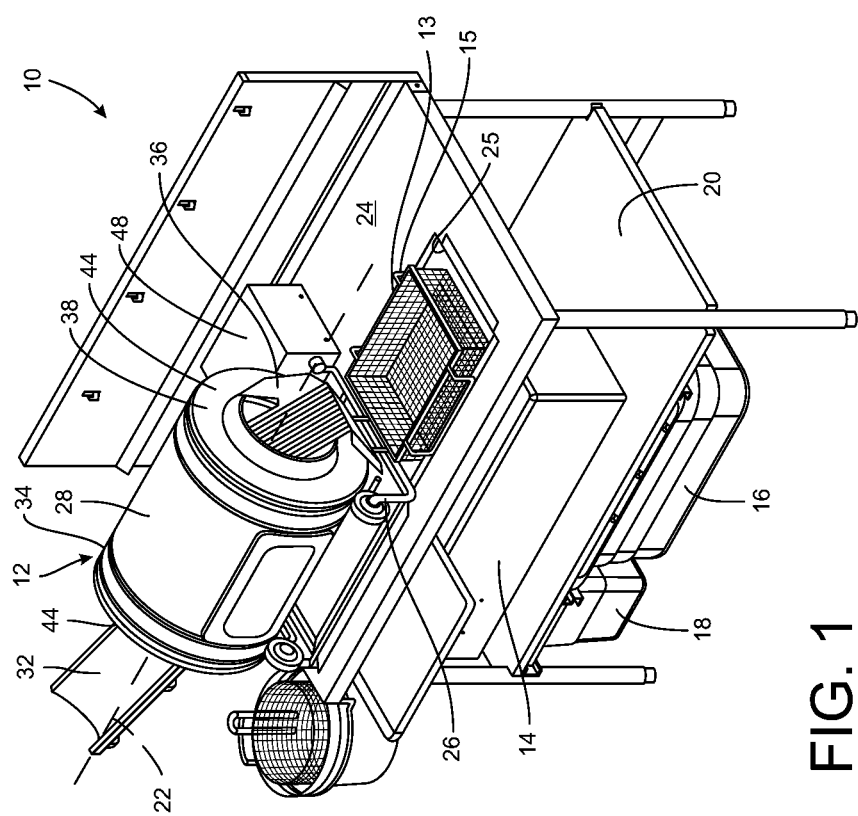
FIG. 1 is a top perspective view of a food coating apparatus according to one embodiment of the present disclosure.

For the purposes of promoting an understanding of the principles of the apparatus disclosed herein, reference will now be made to the embodiments illustrated in the drawings and described in the following written specification. It is understood that no limitation to the scope of the disclosed apparatus is thereby intended. It is further understood that the present apparatus includes any alterations and modifications to the illustrated embodiments and includes further applications of the principles of the apparatus as would normally occur to one skilled in the art to which this apparatus pertains.

A food coating apparatus 10 in accordance with one embodiment of the present disclosure is depicted in FIG. 1. The apparatus 10 may be used in a commercial setting, such as at a fast-food restaurant, for high-volume coating of food product such as chicken parts, fish parts, vegetables, and the like. The coating material could be any of a number of coating types such as bread crumbs, flour, corn meal, etc. As explained in more detail below, the food coating apparatus 10 is configured to divert used coating material into a sifter and then into either a refuse receptacle, if it is unable to be reused, or a reclaimed coating material receptacle, if it is able to be reused to coat additional food product.

The apparatus 10 includes a drum assembly 12, a basket 13, a sifter 14, a reclaimed coating receptacle 16, and a refuse receptacle 18 that are coupled to a table assembly 20. The drum assembly 12 may be similar to that described in U.S. Pat. No. 8,001,920. The drum assembly 12 is rotatably mounted to the table assembly 20 such that a longitudinal axis 22 of the drum assembly 12 is generally parallel to a work surface 24 of the table assembly 20. The basket 13 is removably supported by the work surface 24 of the table assembly 20, the sifter 14 is coupled to the table assembly 20 below the work surface 24, and the reclaimed coating receptacle 16 and refuse receptacle 18 are coupled to the table assembly 20 below the sifter 14.

Figure 2:
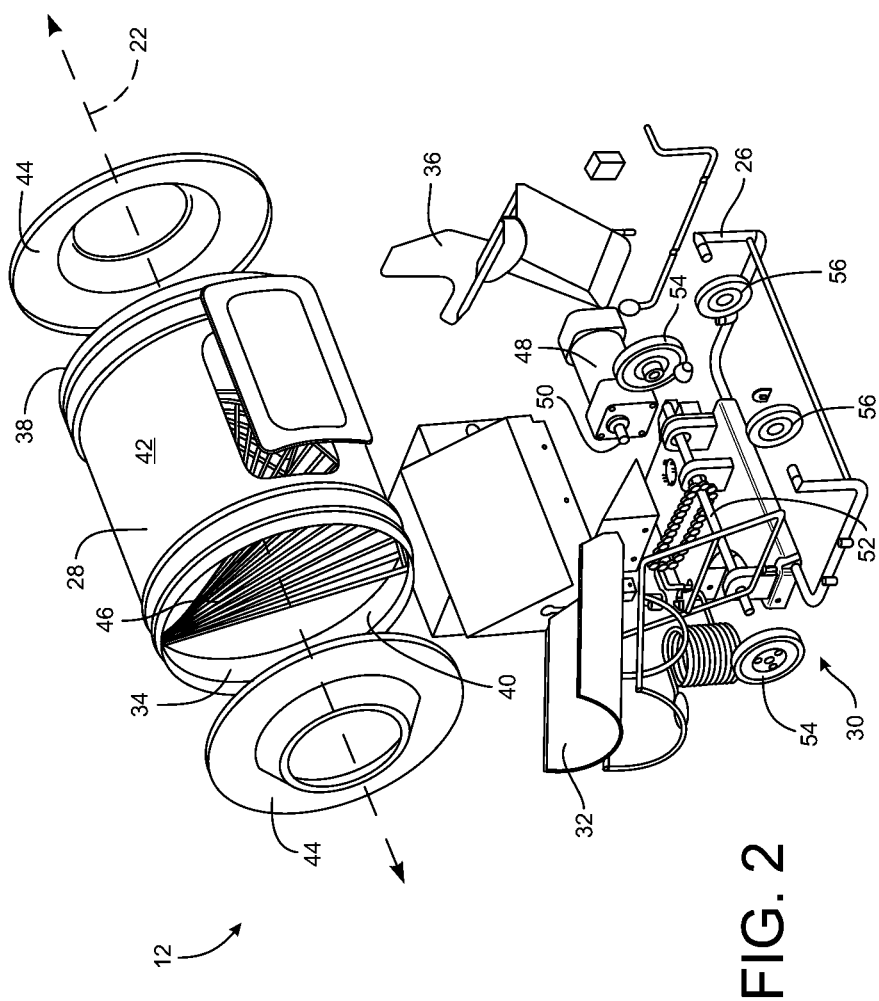
FIG. 2 is a perspective exploded view of a drum assembly of the food coating apparatus of FIG. 1.

Turning now to FIG. 2, the drum assembly 12 includes a stand 26 configured to support a drum 28 and a rotation device 30 which is coupled to the drum 28 and operates to rotate the drum 28 about the longitudinal axis 22 of the drum assembly 12. The drum assembly 12 also includes a loading chute 32 coupled to an input end 34 of the drum 28 to introduce food product and coating material into the drum 28 and an exit ramp 36 coupled to an output end 38 of the drum 28 to accept coated food product and used coating material from the drum 28. The loading chute 32 and the exit ramp 36 are made of any material suitable for food preparation such as, for example, stainless steel.

The drum 28 is substantially shaped as a hollow cylinder with an interior wall 40 and an exterior wall 42 extending from the input end 34 to the output end 38. The interior wall 40 is made of any material suitable for food preparation such as, for example, stainless steel. The drum 28 also includes end caps 44 and a spiral grate 46. One end cap 44 is arranged at the input end 34 of the drum 28 to assist in guiding food product and coating material from the loading chute 32 into the drum 28, and one end cap 44 is arranged at the output end 38 of the drum 28 to assist in guiding coated food product and used coating material from the drum 28 to the exit ramp 36. The end caps 44 are sized and configured to snugly fit within the ends of the drum 28 to form a seal. In at least one embodiment, an annular gasket (not shown) is arranged between each end cap 44 and the drum 28 to prevent infiltration to or leakage from the drum 28. The spiral grate 46 extends from the interior wall 40 and spans the interior of the drum 28 to tumble and guide the food product and the coating material from the input end 34 to the output end 38 so that the coating material covers the food product thoroughly and evenly.

The rotation device 30 is in contact with the exterior wall 42 of the drum 28 to rotate the drum 28 in the following manner. The rotation device 30 includes a motor 48 which operates to rotate a motor shaft 50. The motor shaft 50 in turn rotates a drive shaft 52 and two drive wheels 54 which are fixedly coupled to the ends of the drive shaft 52. The drive wheels 54 are in frictional contact with the exterior wall 42 of the drum 28 so that when the motor 48 operates to rotate the motor shaft 50, which rotates the drive shaft 52, the drive wheels 54 rotate and turn the drum 28. The drive wheels 54 are made out of any material which increases the friction imparted on the exterior wall 42 of the drum 28 to reduce slippage such as, for example, silicone.

The rotation device 30 also includes two casters 56 which are rotatably coupled to the stand 26. The casters 56 are mounted so that they are always in frictional and rotational contact with the exterior wall 42 of the drum 28 and support the drum 28 while the drum 28 rotates under the force applied by the drive wheels 54. In alternative embodiments, the casters 56 can be differently arranged and configured in any way that allows the casters 56 to enable rotation of the drum 28 while supporting the drum 28.

Returning now to FIG. 1, the stand 26 and the motor 48 of the drum assembly 12 are fixedly coupled to the work surface 24 of the table assembly 20 so that the drum assembly 12 remains in a fixed location relative to the table assembly 20 during operation of the rotation device 30 (shown in FIG. 2) and rotation of the drum 28. The basket 13 is removably supported by the work surface 24 of the table assembly 20 and is positioned to receive the coated food product and the used coating material from the output end 38 of the drum 28. The basket 13 is made out of a mesh that is fine enough to retain coated food product within the basket 13 and coarse enough to allow the used coating material to pass through the basket 13. In at least one embodiment, the basket 13 has a handle 15 to enable a user to remove the basket 13 from the work surface 24 to transport coated food product from the food coating apparatus 10.

Figure 3:
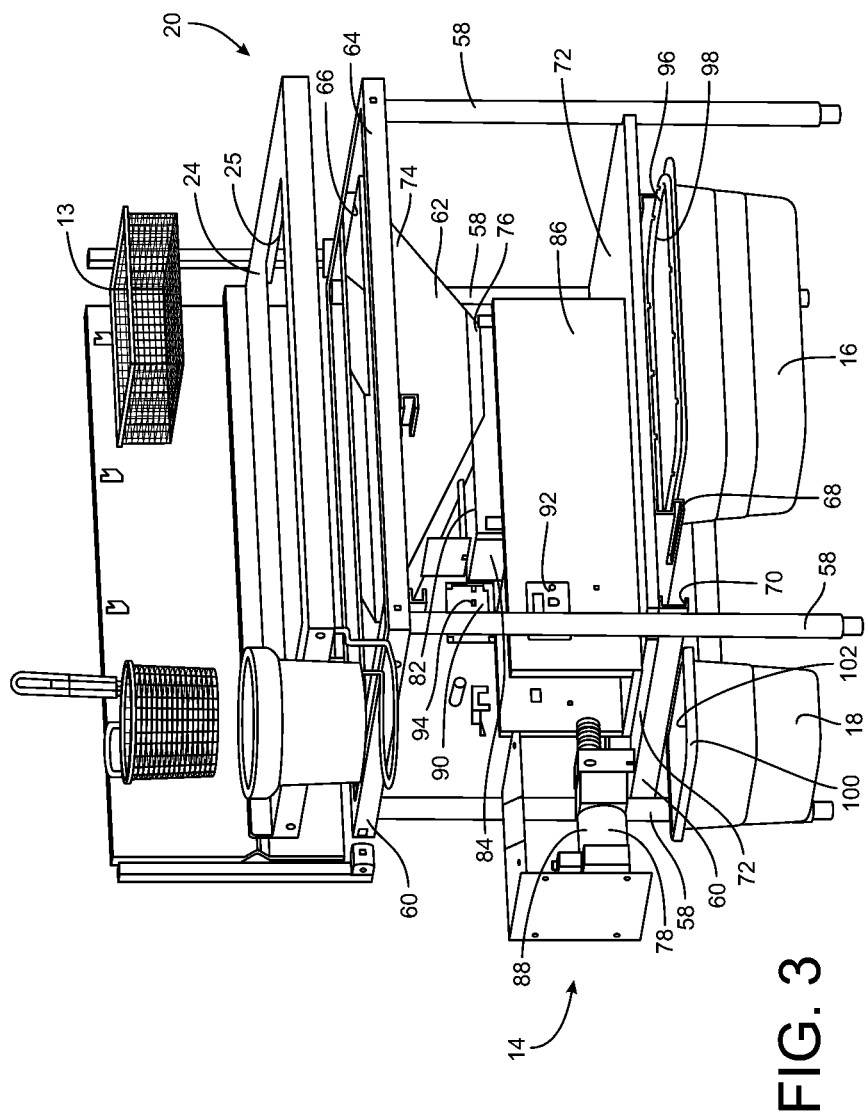
FIG. 3 is a perspective exploded view of a table assembly of the food coating apparatus of FIG. 1.

Turning now to FIG. 3, the table assembly 20 further includes legs 58 and a frame 60 coupled to the work surface 24 to support the food coating apparatus 10 (shown in FIG. 1). The work surface 24 is made of any material suitable for food preparation such as, for example, stainless steel. The frame 60 includes an upper portion 64 having an opening 66 and a lower portion 72 having openings 73A and 73B (shown in FIG. 4).

The table assembly 20 includes an opening 25 formed in the work surface 24 in alignment with the opening 66 formed in the upper portion 64 of the frame 60. The opening 25 and the opening 66 are formed in alignment with a funnel pan 62 extending from the upper portion 64 of the frame 60 in a direction away from the work surface 24. The opening 25 and the opening 66 are sized and positioned to receive and retain the basket 13 so that the basket 13 passes at least partially through the work surface 24 and the upper portion 64 of the frame 60 and the handle 15 remains above the work surface 24 when the basket 13 is removably supported by the table assembly 20. Accordingly, the basket 13 is positioned over and extends at least partially into the funnel pan 62 when the basket 13 is removably supported by the table assembly 20.

The table assembly 20 also includes a reclaimed coating receptacle ledge 68 and a refuse receptacle ledge 70 extending from a lower portion 72 of the frame 60. The reclaimed coating receptacle ledge 68 is sized and arranged to slidably receive and retain the reclaimed coating receptacle 16 and the refuse receptacle ledge 70 is sized and arranged to slidably receive and retain the refuse receptacle 18.

The funnel pan 62 is substantially shaped as a truncated rectangular pyramid oriented with its base located generally at the upper portion 64 and its tapered portion extending downwardly from the upper portion 64 toward the lower portion 72 of the frame 60. The funnel pan 62 is made of any material suitable for food preparation such as, for example, stainless steel. The funnel pan 62 includes a wider opening 74 at the base and a narrower opening 76 at the tapered portion so that anything within the funnel pan 62 is gravity fed toward the narrower opening 76. In one embodiment, the truncated rectangular pyramid is irregularly shaped so that the tapered portion does not extend below but is off-center relative to a centerpoint of the rectangular base. Such an irregular shape assists in guiding anything within the funnel pan 62 into the sifter 14 as it is gravity fed.

The sifter 14 is coupled to the table assembly 20 and is supported by the lower portion 72 of the frame 60. As shown more clearly in FIG. 4, the sifter 14 includes a movement device 78 coupled to and configured to rotate a sifter brush 80. The sifter brush 80 and a sifter cover 82 are positioned within a sifter screen 84, and the sifter screen 84 and the sifter movement device 78 are positioned within a sifter housing 86 that is fixed in position relative to the lower portion 72 of the frame. The sifter 14 is positioned such that the narrower opening 76 of the funnel pan 62 is aligned with an opening 104 of the sifter cover 82. The sifter 14 is further positioned so that a screen portion 106 of the sifter screen 84 is aligned with the opening 73A in the frame and a refuse opening 108 of the sifter screen 84 is aligned with a ramp 110 which is angled downwardly toward the opening 73B in the frame. The opening 73A is located above and aligned with the reclaimed coating receptacle 16 and the opening 73B is located above and aligned with the refuse receptacle 18 so that the sifter 14 is positioned above and aligned with the reclaimed coating receptacle 16 and the refuse receptacle 18.

Figure 5:
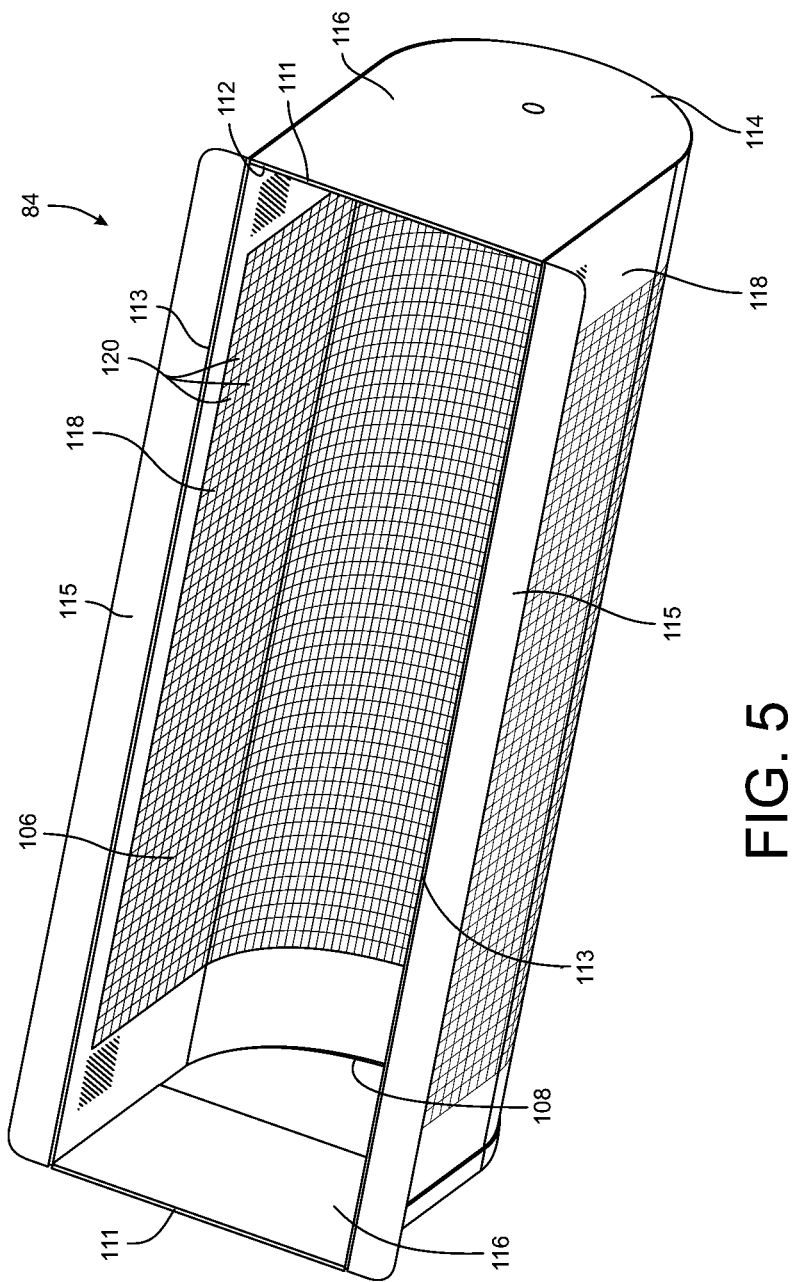
FIG. 5 is a top plan view of the sifter screen of FIG. 4.

Turning now to FIG. 5, the sifter screen 84 is shown in more detail. As shown, the sifter screen 84 has an open top 112 and a rounded bottom 114 that is concave toward the open top 112. The open top 112 is rectangularly shaped having two short sides 111 and two long sides 113 and includes flanges 115 extending outwardly from the long sides 113 in the same plane as the rectangular shape. The sifter screen 84 has two ends 116 extending from the short sides 111 of the open top 112 to the rounded bottom 114 and has two sides 118 extending from the long sides 113 of the open top 112 to the rounded bottom 114. The sides 118 and the rounded bottom 114 of the sifter screen 84 include sifter openings 120 that are small and are arranged close together such that the sides 118 and the rounded bottom 114 form the screen portion 106 of the sifter screen 84. The sifter openings 120 are small enough to retain used coating material that has formed into lumps and clumps and balls within the sifter screen 84 yet large enough to allow loose used coating material to pass through the screen portion 106 and into the reclaimed coating receptacle 16 below. The sifter screen 84 also includes the refuse opening 108 formed within the rounded bottom 114 and one end 116. The refuse opening 108 is large enough to allow used coating material that has formed into lumps and clumps and balls to pass out of the sifter screen 84 and into the refuse receptacle 18 below.

Figure 4:
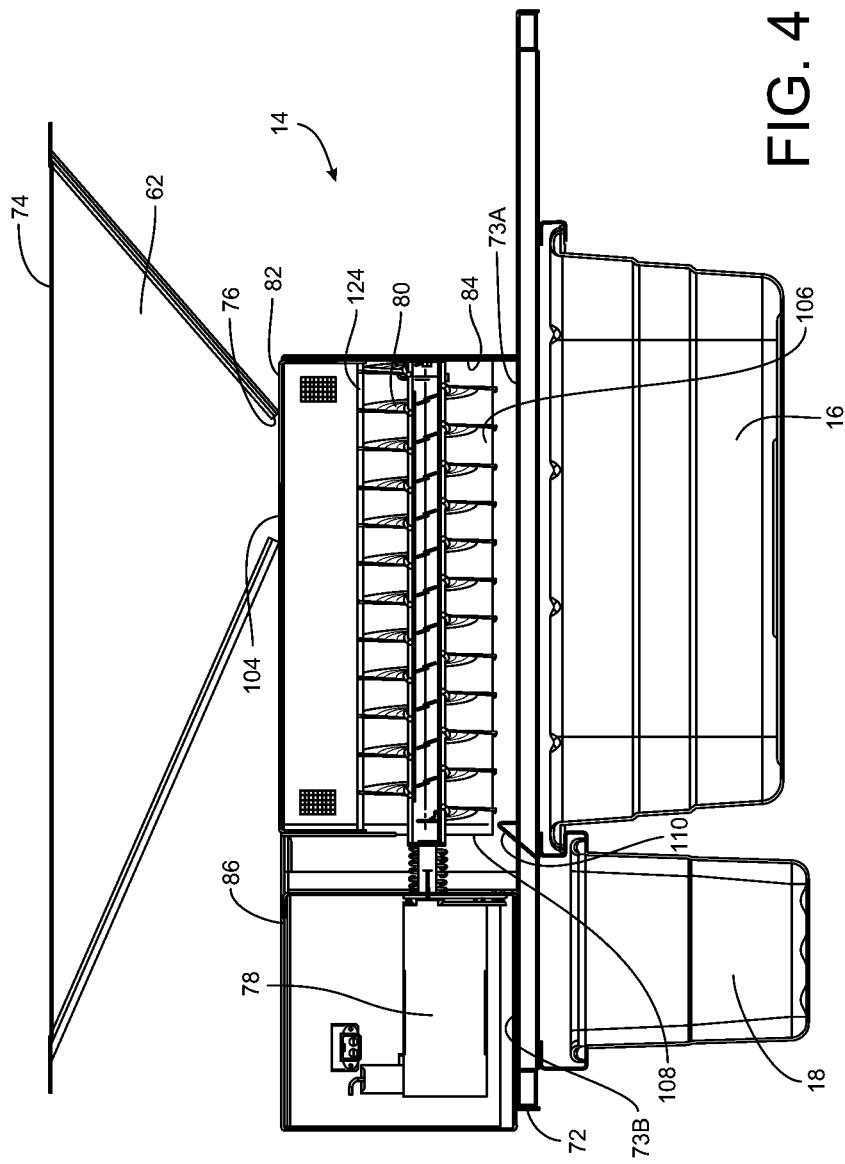
FIG. 4 is a cross-sectional view of a portion of the food coating apparatus of FIG. 1 including a sifter screen, a sifter cover, and a sifter screen.
Figure 6:
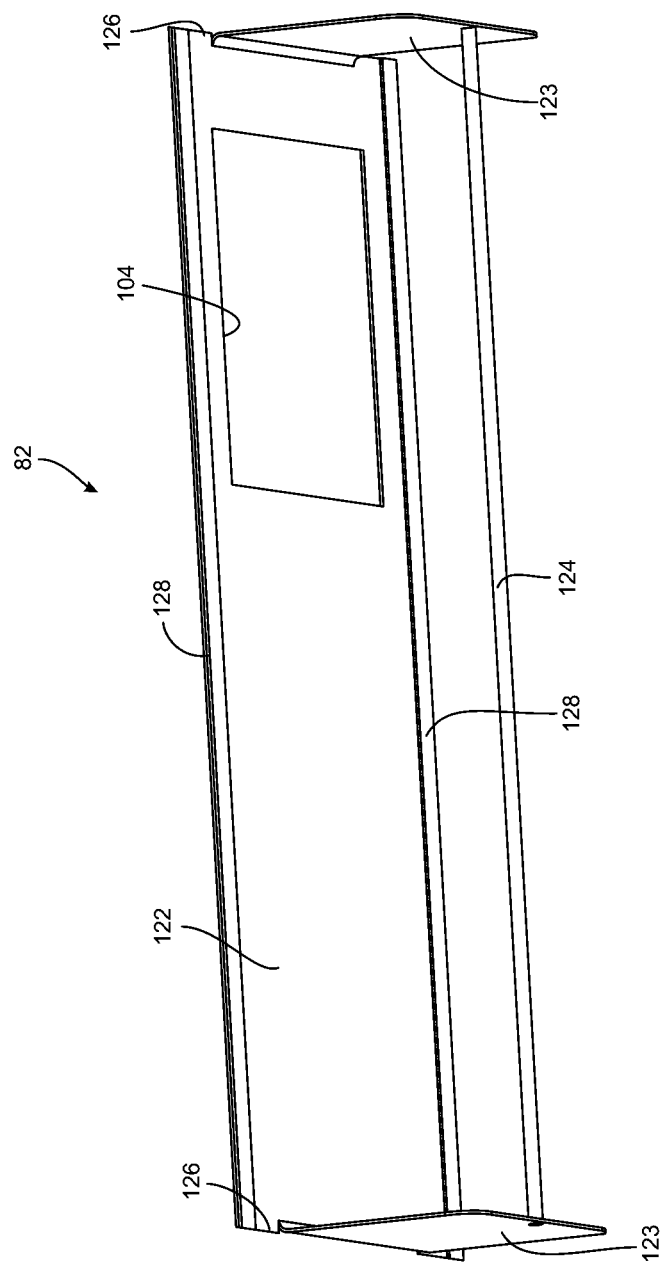
FIG. 6 is a side plan view of the sifter cover of FIG. 4.

Turning now to FIG. 6, the sifter cover 82 is shown in more detail. As shown, the sifter cover 82 includes a top portion 122, fold-down tabs 123 extending downwardly from the top portion 122 and a rod 124 connected to the fold-down tabs 123. The top portion 122 is substantially rectangularly shaped having two shorter sides 126 and two longer sides 128 and is sized and configured such that, when the sifter cover 82 is positioned on the sifter screen 84 as shown in FIG. 4, the longer sides 128 of the sifter cover 82 rest on the flanges 115 of the sifter screen 84 and the shorter sides 126 of the sifter cover 82 are positioned just within the short sides 111 of the sifter screen 84. Accordingly, the sifter cover 82 is sized and configured to cover the open top 112 of the sifter screen 84 and extend downwardly into the sifter screen 84. The top portion 122 also includes the opening 104 which, as mentioned above, is sized and arranged to receive the narrower opening 76 of the funnel pan 62 therein. The fold-down tabs 123 extend downwardly from the shorter sides 126 of the top portion 122 and are sized and arranged to fit within the short sides 111 of the sifter screen 84 when the sifter cover 82 is positioned as shown in FIG. 4. The rod 124 is coupled to both fold-down tabs 123 at a position spaced apart from the top portion 122 so that the rod 124 has substantially the same length as the longer sides 128 of the top portion 122 and spans the sifter cover 82.

Figure 7:
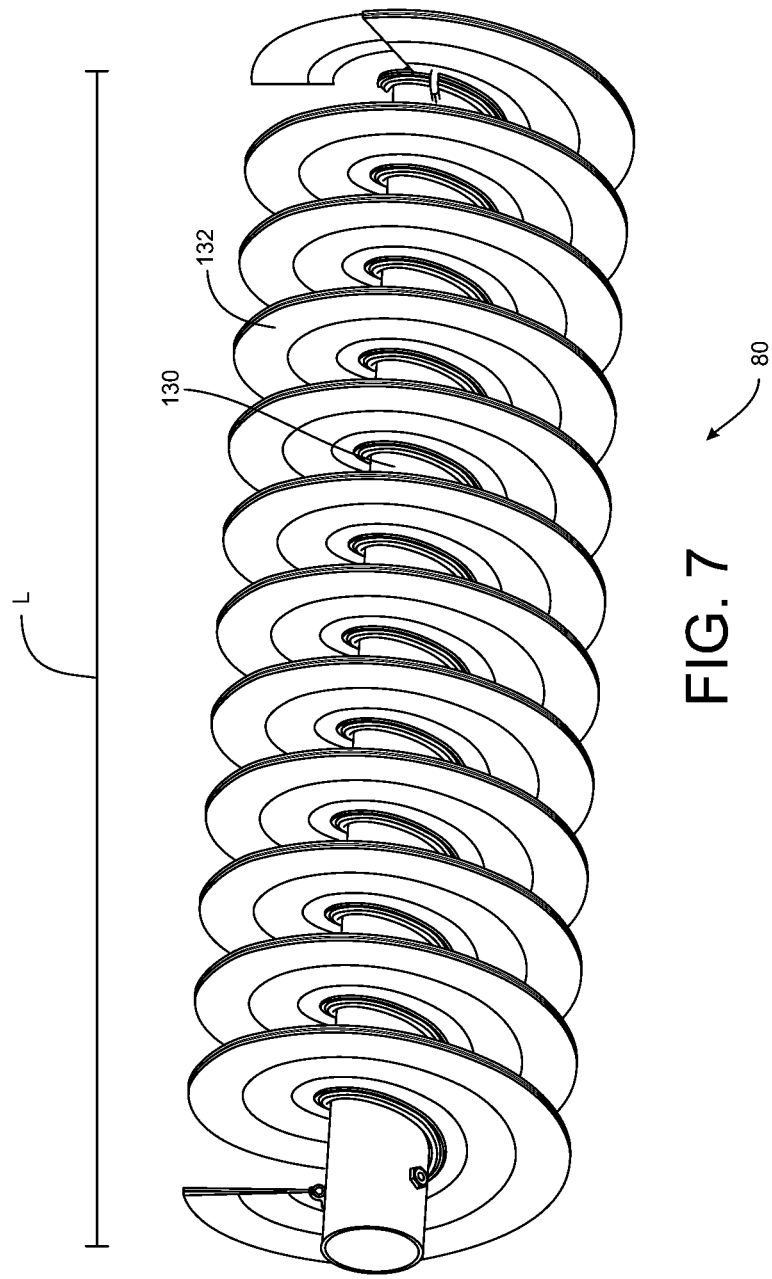
FIG. 7 is a top perspective view of the sifter screen of FIG. 4.

Turning to FIG. 7, the sifter brush 80 is shown in more detail. The sifter brush 80 includes a core 130 and a plurality of bristles 132 extending outwardly from the core 130. The core 130 has a length L and the bristles 132 are arranged along substantially an entirety of the length L. The bristles 132 extend from the core 130 in a helical pattern and are made out of a flexible material such as, for example, nylon. As shown in FIG. 4, the sifter brush 80 is coupled to the movement device 78 such that the movement device 78 can rotate the core 130 thereby moving the bristles 132 within the sifter screen 84. The sifter brush 80 is sized and configured to move within the sifter screen 84 such that as the bristles 132 brush along the screen portion 106 (shown in FIG. 5) of the sifter screen 84 when the sifter brush 80 is rotated so that the bristles 132 are oriented downwardly and such that the bristles 132 brush against the rod 124 of the sifter cover 82 when the sifter brush 80 is rotated so that the bristles 132 are oriented upwardly. In at least one embodiment, the sifter cover 82, the sifter brush 80, and the sifter screen 84 are removable from the sifter 14 for cleaning and replacement.

Returning to FIG. 3, the movement device 78 is fixedly coupled to the housing 86 and is operatively coupled to the sifter brush 80 to rotate the sifter brush 80 within the sifter screen 84. The movement device 78 includes a motor 88 and electrical controls 90 coupled to the motor 88 to selectively operate the motor 88 to rotate the sifter brush 80. In at least one embodiment, the electrical controls 90 include a user interface 92 to allow a user to selectively operate the motor 88. In at least one embodiment, the electrical controls 90 include a timer 94 to selectively operate the motor 88 for a predetermined period of time. In at least one embodiment, the electrical controls 90 are coupled to the rotation device 30 (shown in FIG. 2) of the drum assembly 12 to selectively operate the motor 88 in conjunction with the drum assembly 12.

As shown in FIGS. 3 and 4, the reclaimed coating receptacle 16 includes a flange 96 extending around a top perimeter 98 so that the reclaimed coating receptacle 16 can be grasped and removed from the food coating apparatus 10 and so that the reclaimed coating receptacle 16 can slide along the reclaimed coating receptacle ledge 68 to be received and retained within the food coating apparatus 10 Likewise, the refuse receptacle 18 includes a flange 100 extending around a top perimeter 102 so that the refuse receptacle 18 can be grasped and removed from the food coating apparatus 10 and so that the refuse receptacle 18 can slide along the refuse receptacle ledge 70 to be received and retained within the food coating apparatus 10.

In operation, referring to FIG. 1, food product and coating material are loaded onto the loading chute 32 and are gravity fed into the drum 28 via the end cap 44 at the input end 34. The rotation device 30 (shown in FIG. 2) is operated to rotate the drum 28 so that the food product and the coating material are tumbled together in the drum 28. The spiral grate 46 (shown in FIG. 2) assists in agitating and intermixing the food product and coating material to facilitate sufficient and even coating of the food product with the coating material. Coated food product and used coating material then exit the drum 28 via the end cap 44 at the output end 38 of the drum 28 and are gravity fed down the exit ramp 36 into the basket 13. The basket 13 retains the coated food product within the basket 13 and allows the used coating material to pass through the basket 13.

The used coating material that passes through the basket 13 then passes through the opening 25 in the work surface 24, through the opening 66 in the upper portion 64 of the frame 60 (shown in FIG. 3), and through the wider opening 74 of the funnel pan 62 (shown in FIG. 3). Turning now to FIG. 3, once inside the funnel pan 62, the used coating material is collected by the pyramid shape of the funnel pan 62 and is gravity fed toward, and eventually through, the narrower opening 76 positioned within the opening 104 of the sifter cover 82. Turning now to FIG. 4, the used coating material is thus gravity fed through the sifter cover 82 into the sifter screen 84. As shown in FIG. 4, the used coating material enters the sifter screen 84 away from the movement device 78 and above screen portion 106 of the sifter screen 84 and the reclaimed coating receptacle 16. As mentioned above, the screen portion 106 is formed with sifter openings 120 that are fine enough to retain used coating material that has formed into lumps and clumps and balls yet coarse enough to allow loose used coating material to pass through the screen portion 106.

The movement device 78 is operated to rotate the sifter brush 80 in the sifter screen 84 to urge the used coating material along the screen portion 106 of the sifter screen 84. Urging the used coating material along the screen portion 106 with the sifter brush 80 facilitates separating loose used coating material from the lumps, clumps, and balls of used coating material so that the loose used coating material is free to pass through the sifter openings 120 of the screen portion 106. Urging the used coating material along the screen portion 106 additionally facilitates migration of the lump, clumps, and balls of used coating material along the sifter screen 84 toward the refuse opening 108 and the ramp 110. As the sifter brush 80 rotates, the bristles 132 brush along the screen portion 106 to facilitate movement of loose used coating material through the sifter openings 120. Additionally, as the sifter brush 80 rotates, the bristles 132 brush against the rod 124 of the sifter cover 82 to loosen used coating material that accumulates in and on the bristles 132 during operation of the sifter 14.

Because the refuse opening 108 of the sifter screen 84 is positioned over the ramp 100 which is angled toward the refuse receptacle 18, when the lump, clumps, and balls of used coating material have migrated to the refuse opening 108 of the sifter screen 84, they are urged off the screen portion 106, are gravity fed through the refuse opening 108 of the sifter screen 84, down the ramp 110, through the opening 73B in the lower portion 72 of the frame 60, and into the refuse receptacle 18. The loose used coating material that passes through the sifter openings 120 is gravity fed through the screen portion 106 of the sifter screen 84, through the opening 73A in the lower portion 72 of the frame 60, and into the reclaimed coating receptacle 16.

When the reclaimed coating receptacle 16 has accumulated loose used coating material, the flange 96 or the reclaimed coating receptacle 16 is grasped and the flange 96 of the reclaimed coating receptacle 16 is slid along the refuse receptacle ledge 70 of the table assembly 20 to remove the reclaimed coating receptacle 16 from the apparatus 10. The reclaimed coating receptacle 16 is then raised above the loading chute 32 and the loose used coating material is poured onto the loading chute 32 to be reused in the drum assembly 12. Accordingly, the food coating apparatus 10 is used to collect used coating material, sift the used coating material to separate refuse material from reusable material, and divert the refuse material and the reusable material into different receptacles so that the reusable material can be reinserted into the apparatus.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A food coating apparatus comprising:
   a drum assembly having an input end for receiving coating material and food product, a substantially hollow body for mixing the coating material and the food product to form coated food product and used coating material, and an output end for allowing the coated food product and the used coating material to exit the drum assembly;
   a basket arranged adjacent to the output end of the drum assembly and configured to receive the coated food product and the used coating material from the output end of the drum assembly, to retain the coated food product, and to pass the used coating material;
   a funnel arranged below the basket and configured to collect and funnel the used coating material passed through the basket;
   a sifter arranged below the funnel and configured to receive the funneled used coating material and separate the used coating material into refuse coating material and reusable coating material;
   a reclaimed coating receptacle arranged below the sifter and configured to receive the reusable coating material;
   a refuse receptacle arranged below the sifter and configured to receive the refuse coating material; and
   a table assembly supporting the drum assembly, the basket, the funnel the sifter, the reclaimed coating receptacle, and the refuse receptacle.

2. The food coating apparatus of claim 1 wherein the reclaimed coating receptacle is removable from the table assembly for pouring the reusable coating material into the drum assembly.

3. The food coating apparatus of claim 1, wherein:
   the sifter further includes a sifter screen positioned between the funnel and the reclaimed coating receptacle and the refuse receptacle for receiving the used coating material, and
   the sifter further includes a movement device coupled to a sifter brush positioned within the sifter screen to rotate the sifter brush to facilitate separating the used coating material into refuse coating material and reusable coating material.

4. The food coating apparatus of claim 3, wherein:
   the movement device further includes electrical controls for selectively operating the movement device to rotate the sifter brush.

5. The food coating apparatus of claim 4, wherein:
   the electrical controls include a user interface to enable a user to selectively operate the movement device.

6. The food coating apparatus of claim 4, wherein:
   the electrical controls include a timer to selectively operate the movement device for a predetermined amount of time.

7. The food coating apparatus of claim 4, wherein:
   the drum assembly further includes a rotation device for rotating the body to mix the coating material and the food product, and
   the electrical controls include a connection with the rotation device for selectively operating the movement device in conjunction with the rotation device.

8. A table assembly for use with a food coating apparatus, the table assembly comprising:
   a funnel configured to collect used coating material from the food coating apparatus;
   a sifter arranged to receive the used coating material from the funnel, the sifter including a sifter screen and a movement device coupled to a sifter brush positioned within the sifter screen, the movement device operated to rotate the sifter brush to separate the used coating material into refuse coating material and reusable coating material;
   a refuse receptacle configured to receive the refuse coating material from the sifter; and
   a reclamation receptacle configured to receive the reusable coating material from the sifter.

9. The table assembly of claim 8, wherein the reclamation receptacle is removably supported by the table assembly so that the reusable coating material can be poured from the reclamation receptacle into the food coating apparatus.

10. The table assembly of claim 8, wherein the movement device further includes electrical controls for selectively operating the movement device to rotate the sifter brush.

11. The table assembly of claim 10, wherein the electrical controls include an electrical connection with the food coating apparatus to selectively operate the movement device in conjunction with operation of the food coating apparatus.

\* \* \* \* \*